(12) United States Patent
Hall et al.

(10) Patent No.: US 12,115,966 B2
(45) Date of Patent: Oct. 15, 2024

(54) METHOD FOR OPERATING A DRIVE FOR A MOTOR VEHICLE AND CORRESPONDING DRIVE DEVICE

(71) Applicant: AUDI AG, Ingolstadt (DE)

(72) Inventors: Matthew David Hall, Marbach am Neckar (DE); Benedikt Xander, Ilsfeld (DE); Andreas Zeyer, Stuttgart (DE); Guido Schiedt, Leutenbach (DE)

(73) Assignee: AUDI AG, Ingolstadt (DE)

( * ) Notice: Subject to any disclaimer, the term of this patent is extended or adjusted under 35 U.S.C. 154(b) by 866 days.

(21) Appl. No.: 17/261,996

(22) PCT Filed: Jan. 20, 2020

(86) PCT No.: PCT/EP2020/051299
§ 371 (c)(1),
(2) Date: Jan. 21, 2021

(87) PCT Pub. No.: WO2020/152110
PCT Pub. Date: Jul. 30, 2020

(65) Prior Publication Data
US 2021/0261112 A1    Aug. 26, 2021

(30) Foreign Application Priority Data

Jan. 24, 2019   (DE) ..................... 10 2019 200 840.2

(51) Int. Cl.
*B60W 20/10*   (2016.01)
*B60K 6/48*    (2007.10)
(Continued)

(52) U.S. Cl.
CPC ............... *B60W 20/10* (2013.01); *B60K 6/48* (2013.01); *B60W 10/06* (2013.01); *B60W 10/08* (2013.01);
(Continued)

(58) Field of Classification Search
CPC ...... B60W 20/10; B60W 10/06; B60W 10/08; B60W 2510/087; B60W 2510/244;
(Continued)

(56) References Cited

U.S. PATENT DOCUMENTS

| | | |
|---|---|---|
| 6,988,572 B2 | 1/2006 | Tatara et al. |
| 10,011,268 B2 | 7/2018 | Arcangeli et al. |

(Continued)

FOREIGN PATENT DOCUMENTS

| | | |
|---|---|---|
| CN | 108340909 A | 7/2018 |
| DE | 42 17 668 C1 | 5/1993 |

(Continued)

OTHER PUBLICATIONS

2019 Insight Specifications and Features, Jun. 20, 2018, https://hondanews.com/en-us/honda-automobiles/releases/release-99b9311b568240639b28482eb820d667-2019-insight-specifications-and-features (Year: 2018).*

(Continued)

*Primary Examiner* — James J Lee
*Assistant Examiner* — Alexander George Matta
(74) *Attorney, Agent, or Firm* — Maier & Maier, PLLC

(57) ABSTRACT

A method for operating a drive device for a motor vehicle, the drive device having a first drive unit designed as an internal combustion engine and a second drive unit designed as an electrical machine, which together at least temporarily provide a drive torque of the drive device on an drive shaft, the drive torque being set to a requested default torque. It In a first operating mode, before changing a speed of the drive shaft for the first drive unit, a torque characteristic is selected from multiple torque characteristics. In the first operating mode, while the speed is being changed, the first drive unit is operated according to the selected torque characteristic for providing at least one part of the specified torque, and a (Continued)

differential torque between the specified torque and the torque provided by the first drive unit boil is provided by the second drive unit.

13 Claims, 2 Drawing Sheets

(51) Int. Cl.
  *B60W 10/06* (2006.01)
  *B60W 10/08* (2006.01)
(52) U.S. Cl.
  CPC ............ *B60K 2006/4825* (2013.01); *B60W 2510/087* (2013.01); *B60W 2510/244* (2013.01); *B60W 2540/10* (2013.01); *B60W 2710/0666* (2013.01); *B60W 2710/083* (2013.01); *B60W 2710/1005* (2013.01); *B60W 2710/105* (2013.01)
(58) Field of Classification Search
  CPC ..... B60W 2540/10; B60W 2710/0666; B60W 2710/083; B60W 2710/1005; B60W 2710/105; B60W 10/26; B60W 2050/0026; B60W 2510/1005; B60W 30/1882; B60K 6/48; B60K 2006/4825; Y02T 10/62
  See application file for complete search history.

(56) References Cited

U.S. PATENT DOCUMENTS

| | | | | |
|---|---|---|---|---|
| 2002/0086769 | A1* | 7/2002 | Hemmingsen .. | B60W 30/18027 477/79 |
| 2004/0235613 | A1* | 11/2004 | Aoki ..................... | B60W 10/08 477/3 |
| 2007/0137909 | A1* | 6/2007 | Zillmer .................. | B60K 6/485 180/65.245 |
| 2008/0293538 | A1* | 11/2008 | Saito ..................... | B60W 10/02 477/3 |
| 2011/0174557 | A1* | 7/2011 | Tanba .................... | B60W 10/02 903/902 |
| 2015/0219210 | A1* | 8/2015 | Fairgrieve ............. | B60W 30/14 701/58 |
| 2018/0179970 | A1* | 6/2018 | Serrano ................ | B60W 10/023 |
| 2018/0208180 | A1 | 7/2018 | Schneider et al. | |

FOREIGN PATENT DOCUMENTS

| | | |
|---|---|---|
| DE | 10 2004 013 581 A1 | 11/2004 |
| DE | 102006010223 A1 | 9/2007 |
| DE | 10 2011 104 422 A1 | 12/2012 |
| DE | 102014105724 A1 | 10/2014 |
| DE | 10 2014 214 715 A1 | 1/2016 |
| DE | 10 2016 224 130 A1 | 6/2018 |
| EP | 0830968 A1 | 3/1998 |
| EP | 0 828 624 B1 | 12/2000 |
| EP | 1 987 995 A2 | 11/2008 |
| WO | 2009/021913 A2 | 2/2009 |
| WO | 2015/011223 A2 | 1/2015 |

OTHER PUBLICATIONS

Vandergriff Honda, Everything You Need to Know About The All-New 2019 Honda Insight, Jul. 26, 2018, https://www.vandergriffhonda.com/blog/2018/july/26/everything-you-need-to-know-about-the-all-new-2019-honda-insight.htm (Year: 2018).*

Examination Report issued on Oct. 31, 2019 in corresponding German application No. 10 2019 200 840.2; 12 pages including Machine-generated English-language translation.

International Search Report issued on May 7, 2020 in corresponding International application No. PCT/EP2020/051299; 7 pages.

Written Opinion of the International Searching Authority issued on May 7, 2020 in corresponding International application No. PCT/EP2020/051299; 11 pages including Machine-generated English-language translation.

International Preliminary Report on Patentability issued on Nov. 24, 2020 in corresponding International application No. PCT/EP2020/051299; 38 pages.

Written Opinion under Rule 66 issued on Oct. 28, 2020 in corresponding International application No. PCT/ EP2020/051299; 8 pages including Machine-generated English-language translation.

Office Action issued on Oct. 13, 2023, in corresponding Chinese Application No. 202080004090.5, 10 pages.

* cited by examiner

METHOD FOR OPERATING A DRIVE FOR A MOTOR VEHICLE AND CORRESPONDING DRIVE DEVICE

FIELD

The invention relates to a method for operating a drive device for a motor vehicle, the drive device having a first drive unit designed as an internal combustion engine and a second drive unit designed as an electrical machine, which together at least temporarily provide a drive torque of the drive device on an drive shaft, the drive torque being set to a requested default torque, wherein in a first operating mode, before a speed of the drive shaft is changed for the first drive unit, a torque characteristic is selected from several torque characteristics, wherein in the first operating mode, while the speed is changed, the first drive unit is operated exclusively in accordance with the selected torque characteristic for providing at least a part of the specified torque, and a differential torque of the specified value torque to the torque provided by the first drive unit is provided by means of the second drive unit. The invention further relates to a drive device for a motor vehicle.

BACKGROUND

The prior art includes document U.S. Pat. No. 10,011,268 B2, for example. This describes a method for controlling a hybrid vehicle with a parallel architecture and with an unknown speed profile for optimizing fuel consumption.

The document EP 1 987 995 A2 describes a method for controlling a hybrid vehicle, which has an internal combustion engine and an electric machine. When a driver-requested mode is a power mode that attaches greater importance to acceleration performance versus fuel efficiency, a torque of the power mode that is greater than a torque optimal for fuel consumption is used as a target value of a torque of the internal combustion engine.

Furthermore, the publications DE 10 2004 013 581 A1, WO 2009/021913 A1 and DE 42 17 668 C1 are known from the prior art.

SUMMARY

The object of the invention is to propose a method for operating a drive device for a motor vehicle which has advantages over the known methods, in particular enables the drive device to be operated significantly more efficiently and/or with lower emissions.

This object is achieved according to the invention by a method for operating a drive device for a motor vehicle. It is provided here that, after the torque characteristic has been selected, a constant throttle valve position corresponding to the torque characteristic on the first drive unit and/or a valve train of the first drive unit is set to a constant filling corresponding to the torque characteristic.

Basically, it is provided that, in a first operating mode, before changing a speed of the drive shaft for the first drive unit, a torque characteristic is selected from multiple torque characteristics, wherein in the first operating mode, while the speed is being changed, the first drive unit is operated exclusively according to the selected torque characteristic for providing at least one part of the specified torque, and a differential torque between the specified torque and the torque provided by the first drive unit is provided by means of the second drive unit.

The method is provided and designed for operating the drive device, the drive device preferably being part of the motor vehicle. The drive device is used for driving the motor vehicle, and thus for supplying a drive torque that is targeted toward driving the motor vehicle. The drive device provides the drive torque on the drive shaft. The drive shaft is drive-connected to at least one driven wheel axle of the motor vehicle via at least one clutch and/or at least one gear change transmission, for example.

Alternatively, the drive shaft is drive-connected to the first drive unit and the second drive unit via the clutch and/or the gear change transmission. In this case, the drive shaft is preferably rigidly and/or permanently coupled to the at least one wheel axle of the motor vehicle. For example, the clutch is a start clutch and the gear change transmission is a multi-speed gear, by means of which different gear ratios can be set between the drive shaft and the at least one wheel axle.

The drive device has multiple drive units, namely at least the first and second drive units, for providing the drive torque on the drive shaft. The first drive unit is provided in the form of the internal combustion engine, and the second drive unit is provided in the form of the electrical machine. In this respect, the drive device can also be referred to as a hybrid drive device. The drive device is designed such that the first and second drive units jointly provide the drive torque at least temporarily.

It can therefore be provided that the drive torque is provided solely by means of the first drive unit and without the second drive unit, solely by means of the second drive unit and without the first drive unit, or with the aid of both the first drive unit and the second drive unit. For this purpose, the first and second drive units are drive-connected to the drive shaft, preferably each at least temporarily rigidly.

For example, the first drive unit is drive-connected to the drive shaft via a clutch, in particular a separating clutch, whereas the second drive unit is permanently drive-coupled to the drive shaft, in particular rigidly. In a first shifting position of the separating clutch, the first drive unit is drive-coupled to the drive shaft, in particular rigidly. In a second shifting position, however, the first drive unit is decoupled from the drive shaft. For example, the first drive unit is at least temporarily drive-coupled to the drive shaft via the second drive unit. For this purpose, in particular, the separating clutch is drive-connected between the first drive unit and the second drive unit.

However, it can also be provided that the second drive unit is drive-connected to the drive shaft via a (further) coupling or a (further) separating coupling, respectively. In this case, the second drive unit is optionally coupled to or decoupled from the drive shaft. For example, the further clutch is drive-connected between an intermediate shaft, to which the first drive unit is drive-connected via the coupling, and a gear change transmission. In other words, the intermediate shaft can be decoupled from the first drive unit by means of the clutch, and from the gear change transmission by means of the further clutch.

While the drive device is in operation, the drive torque provided by it is set to the specified torque, in particular set in a controlling and/or regulating manner. For example, the specified torque is specified by a driver of the motor vehicle and/or a driver assistance device of the motor vehicle, and is set on the drive device. In the first case, the specified torque is preferably determined from a position of an operating element, in particular an driving pedal and/or an accelerator pedal.

It can be provided that the first and second drive units are controlled so that they jointly provide the drive torque so that the highest possible overall efficiency of the drive device is achieved at every operating point and/or at every point in time. This can be achieved comparatively easily at a constant operating point, i.e. at constant torque and constant speed of the drive shaft. Such an optimization is much more difficult with transient processes. For this reason, it is basically provided, according to the invention, to provide a stationary base load by means of the first drive unit and to additionally use the second drive unit for dynamic and/or transient processes.

For this purpose, a torque characteristic is selected from multiple torque characteristics for the first drive unit, and this selected torque characteristic is then set on the first drive unit. The first drive unit is then operated exclusively with this torque characteristic, i.e. also at different speeds on the drive shaft, in particular until the end of the change in speed. Despite different operating points of the drive device, there is initially no change in the selected torque characteristic. Rather, the first drive unit is operated permanently with this at least for a certain period of time. The torque characteristic is to be understood as a torque-speed characteristic which relates the torque of the first drive unit to its speed.

This can of course lead to the torque provided by the first drive assembly being greater or less than the specified torque. The second drive unit is therefore used to set the drive torque applied to the drive shaft to the requested specified torque. For this purpose, the difference between the specified torque and the torque provided by the first drive unit is calculated. This difference, which can also be referred to as differential torque, is then set on the second drive unit so that the drive torque corresponding to the specified torque is ultimately applied to the drive shaft.

The procedure described is carried out in particular while the speed of the drive shaft is being changed. The torque characteristic is thus selected from the multiple torque characteristics even before the speed is changed, in particular immediately before the change begins, or immediately at the beginning of the change. While the speed is being changed, the first drive unit is subsequently operated in accordance with the selected torque characteristic, in particular until the changing of the speed is complete. For example, it is therefore provided to initiate the procedure described as soon as a change in the rotational speed occurs, and to maintain it until the change in the rotational speed is complete. Before changing the speed and after changing the speed, the speed is constant, at least over a certain period of time. For example, the change in the speed is considered completed if the speed after the change is constant over a period of at least 0.5 sec, at least 1 sec, at least 2.5 sec, or at least 5 sec.

The procedure described enables particularly efficient operation of the drive device, especially during transient operation of the drive device. In addition, the procedure enables use of a drive device with an extremely simple design, in particular a simply designed first drive unit. In this respect, the drive device can be designed to be inexpensive on the one hand and weight-saving on the other hand.

The invention provides that, after the torque characteristic has been selected, a constant throttle valve position corresponding to the torque characteristic on the first drive unit and/or a valve train of the first drive unit is set to a constant filling corresponding to the torque characteristic. For example, each of the torque characteristics corresponds to a certain throttle position of the first drive unit, in particular over an entire nominal speed range of the first drive unit or a large part of the nominal speed range, i.e. over at least 50%, at least 75%, or at least 90% of the nominal speed range. It is therefore provided to keep the throttle valve position of the first drive unit constant while the speed is changed, in particular in order to reduce pulsations in the air path.

The nominal speed range is to be understood as a speed range which extends from a minimum speed of the first drive unit to a maximum speed of the first drive unit. The minimum speed is the speed at which the first drive unit is able to run automatically, that is to say without external torque supply, and to this extent can automatically increase its speed. The maximum speed is the speed to which the first drive unit is limited during normal operation, i.e. the maximum speed for which the first drive unit is intended.

Additionally or alternatively, the valve train of the first drive unit can be used to set a filling or cylinder filling for the first drive unit that corresponds to the torque characteristic. Here, each torque characteristic is assigned exactly one constant charge, which is used continuously while the speed is changed. The valve train is preferably a fully variable valve train. If such a valve train is provided, it can particularly preferably be provided to design the first drive unit without a throttle valve, so that an intake cross-section of the first drive unit is constant over time. Keeping the throttle valve position or the filling at a constant level ensures that the first drive unit responds extremely quickly, so that the speed can be changed quickly. Correspondingly, there is a significant increase in dynamics compared to conventional drive devices.

Another embodiment of the invention provides that an internal combustion engine without a throttle valve and/or a naturally aspirated internal combustion engine is used as the first drive unit. The possibility of designing the internal combustion engine without a throttle valve has already been pointed out above. This is particularly the case if the internal combustion engine has the fully variable valve train, by means of which the filling of the cylinders of the first drive unit can be adjusted to the filling corresponding to the torque characteristic.

Additionally or alternatively, the internal combustion engine can be in the form of the naturally aspirated internal combustion engine or as a naturally aspirated engine. In particular, in this case the internal combustion engine does not have an exhaust gas turbocharger and/or a compressor by means of which fresh gas supplied to the internal combustion engine is compressed. The fresh gas is supplied in uncompressed manner to the internal combustion engine. The design as a naturally aspirated internal combustion engine is comparatively simple in terms of construction and also enables high dynamics, because no auxiliary units, such as the exhaust gas turbocharger or the compressor, have to be set to the operating point of the drive device.

A further development of the invention provides that the torque characteristic is selected based on a specified torque that was present before the speed was changed and/or a charge level of an energy store for the second drive unit and/or a temperature of the drive device. For example, the torque characteristic is selected so that it is as close as possible to the specified torque that is present before the speed is changed. In addition, it can be decided on the basis of the charge level whether the selected torque characteristic should provide a torque at a given speed that is greater or less than the specified torque.

For example, when the charge level is low, a torque characteristic is selected that is greater than the specified torque at the given speed, whereas, when the charge level is high, the torque characteristic is selected such that the torque at the given speed is less than the specified torque. For example, the given speed is the current speed of the drive unit and/or the drive shaft, and/or a minimum speed or a maximum speed that is included in the torque characteristic.

Of course, when selecting the torque characteristic, the temperature of the drive device, in particular of the second drive unit, can be used additionally or alternatively. For example, the higher the temperature of the drive device, the lower the selected torque, so that the second drive unit is relieved regarding the drive. Conversely, the lower the temperature, the greater the selected torque of the torque characteristic. The procedure described enables particularly efficient operation of the drive device.

Within the scope of a further embodiment of the invention, it is provided that the selected torque characteristic is maintained until a gear change of a gear change transmission, and the torque characteristic is only selected again from the multiple torque characteristics during the gear change. For example, the gear change is performed as part of changing the speed. However, it can also be provided that the first drive unit is operated continuously with the selected torque characteristic completely independently of a change in the speed, and the torque characteristic is only selected again during the gear change.

As already explained, the gear change transmission can be connected to the drive shaft so that a drive connection is established between the drive shaft and the at least one wheel axle of the motor vehicle via the gear change transmission. Alternatively, however, it can also be provided that the drive shaft is connected to the first and second drive units via the gear change transmission. The first and second drive units are present on one side of the gear change transmission, and the drive shaft is present on the other side. Preferably, in this case the first and second drive units unit are drive-connected to a common output shaft which is in turn drive-connected to the drive shaft via the gear change transmission. Thus, preferably, the first and second drive units are drive-coupled or can be drive-coupled to the drive shaft only via the output shaft. The output shaft can also be referred to as intermediate shaft. In any case, the gear change transmission is part of the drive device.

For example, at least one of the torque characteristics, in particular exactly one of the torque characteristics, is assigned to each gear of the gear change transmission. If the corresponding gear is set on the gear change transmission, the selected torque characteristic is set equal to the torque characteristic assigned to the corresponding gear and maintained until another gear change. In other words, the torque characteristic is selected, in particular selected again, exclusively when the gear change transmission is shifting gears. This enables particularly effective operation of the drive device.

Another embodiment of the invention provides that the first drive unit has a first nominal power and the second drive unit has a second nominal power, the first nominal power being selected to be greater than the second nominal power by a factor of at most 5, at most 4, at most 3 or at most 2, or to be equal to the second nominal power. The closer the first and second nominal powers are to each another, the better the second drive unit can support the first drive unit during transient processes. It is therefore particularly preferable for the second nominal power to correspond to the first nominal power so that the two drive units have the same nominal power in this respect. However, it can be provided that the first nominal power is greater than the second nominal power. However, this is limited to a factor of at most 5 or less. Please refer to the specified values. In any case, the nominal powers are of the same order of magnitude so that the first drive unit can be effectively supported by the second drive unit.

A further development of the invention provides that the first and second drive units are temperature-controlled by means of a common cooler. The two drive units, i.e. the first and second drive units, are connected to the same coolant circuit in which the common cooler is also present. The common cooler is preferably a main cooler of the coolant circuit, in particular the only cooler. It is particularly preferred that the coolant circuit has no further cooler in addition to the common cooler. In particular, the cooler is understood to be a direct cooler. The described mode of operation enables a structurally simple design.

Another embodiment of the invention provides that the multiple torque characteristics include a plurality of discrete torque characteristics, the torques of which differ at a certain speed by at least 5%, at least 10%, at least 15%, or at least 20% of a nominal torque of the first drive unit. For example, the specific speed can be a minimum speed or a maximum speed, which is detected by the torque characteristics. In principle, however, the speed can be selected as desired. The discrete torque characteristics run separately from each another and have no points of intersection. Rather, they are clearly spaced from each another, namely at the specific speed, by torques which have the stated values.

For example, all discrete torque characteristics have the same distance from the respective adjacent torque characteristics at the specific speed. However, different distances can also be implemented; for example, the distances are smaller with a lower torque than with a higher torque or vice versa. The discrete torque characteristics are preferably permanently stored, i.e. they are not adapted during operation of the drive device. The torque characteristics are preferably stored already in the drive device ex-works. A particularly effective increase in efficiency is achieved in this way.

Finally, within the scope of a further embodiment of the invention, it can be provided that, in a first operating mode, the first and second drive units are operated for providing the drive torque corresponding to the specified torque so that there is minimal energy consumption for a current operating point. This procedure has already been mentioned above. For example, a change is made from the first operating mode to the second operating mode when the speed is constant or has been constant over a certain period of time. In this respect, for example, the second operating mode is used for constant speeds, and the first operating mode is used for changing speeds in order to achieve a particularly high efficiency of the drive device in each case. For example, the specific period of time is at least 1 sec, at least 5 sec, at least 10 sec, at least 15 sec, or at least 30 sec.

The invention also relates to a drive device for a motor vehicle, in particular for performing the method according to the statements in the context of this description, the drive device having a first drive unit designed as an internal combustion engine and a second drive unit designed as an electrical machine, which jointly provide a drive torque of the drive device on an drive shaft at least temporally, wherein the drive torque is adjustable or is set to a requested specified torque.

The drive device is designed to select, in a first operating mode, before changing a speed of the drive shaft for the first drive unit, a torque characteristic from multiple torque characteristics, wherein in the first operating mode, during the change in speed, the first drive unit is operated exclusively according to the selected torque characteristic for providing at least a part of the specified torque, and a differential torque between the specified torque and the torque provided by the first drive unit is provided by means of the second drive unit. Furthermore, the drive device is so designed that, after the torque characteristic has been selected, a constant throttle valve position corresponding to the torque characteristic on the first drive unit and/or a valve train of the first drive unit is set to a constant filling corresponding to the torque characteristic.

The advantages of such a design of the drive device and of such a procedure have already been discussed. Both the drive device for the motor vehicle and the method for operating said energy storage device can be further refined in a favorable manner according to the embodiments in the scope of this description, to which reference will therefore be made.

In the context of a particularly preferred embodiment of the invention it is provided that the second drive unit is arranged axially parallel to the first drive unit and can be coupled to the first drive unit via a gear arrangement. The axially parallel arrangement is understood to mean that machine shafts of the first and second drive units are parallel to each another. In addition, the second drive unit is preferably arranged next to the first drive unit so that the two drive units are arranged in overlap with each other in the axial direction with respect to their axes of rotation. The second drive unit is preferably arranged completely next to the first drive unit so that the entire second drive unit is in overlap with the first drive unit or vice versa.

The two drive units are preferably coupled to each other via the gear arrangement, in particular rigidly and/or permanently, or at least can be coupled. For example, the gear arrangement has a gear ratio different from one, and connects the second drive unit to the drive shaft or a shaft that is coupled or can be coupled to the first drive unit. For example, the first drive unit is drive-connected via a separating clutch to an intermediate shaft which is connected to the drive shaft via the gear change transmission. The gear arrangement now establishes a connection between the second drive unit and the intermediate shaft so that the second drive unit is connected via the gear arrangement to the intermediate shaft, and via this on to the first drive unit the one hand and to the gear change transmission and therefore the drive shaft on the other hand.

BRIEF DESCRIPTION OF THE FIGURES

In the following, the invention will be explained in greater detail with reference to the exemplary embodiments depicted in the drawings, without this serving to limit the invention. The figures show as follows.

DETAILED DESCRIPTION

Figure 1:
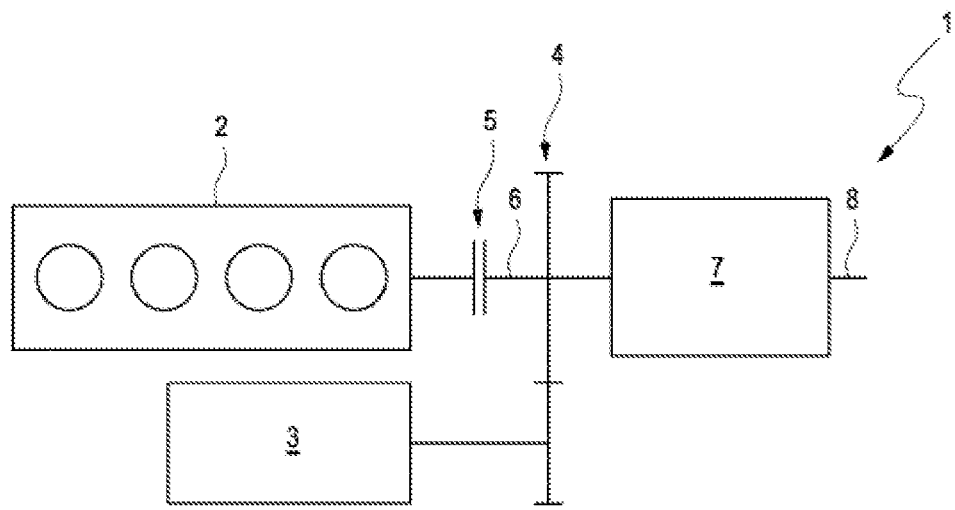
FIG. 1 shows a schematic representation of a drive device for a motor vehicle.

FIG. 1 shows a schematic representation of a drive device 1 for a motor vehicle. The drive device 1 has a first drive unit 2 and a second drive unit 3. The first drive unit 2 is designed as an internal combustion engine, and the second drive unit 3 as an electrical machine. The two drive units 2 and 3 are drive-coupled or can be drive-coupled to each via a gear arrangement 4. The two drive units 2 and 3 are particularly preferably arranged axially parallel next to each other, as shown here. However, other arrangements can also be implemented.

In the exemplary embodiment shown here, the first drive unit 2 is drive-connected via a separating clutch 5 to an intermediate shaft 6 to which both the gear arrangement 4 and a gear change transmission 7 are connected. A drive shaft 8 is drive-connected to the intermediate shaft 6 via the gear change transmission 7. The drive shaft 8 can be driven via the gear change transmission 7 either by means of the first drive unit 2, the second drive unit 3, or both drive units 2 and 3. Optionally, with regard to the drive, a further clutch, in particular a further separating clutch, can be arranged between the intermediate shaft 6 and the drive shaft 7, preferably, with regard to the drive, between the intermediate shaft 6 and the gear change transmission 7.

Figure 2:
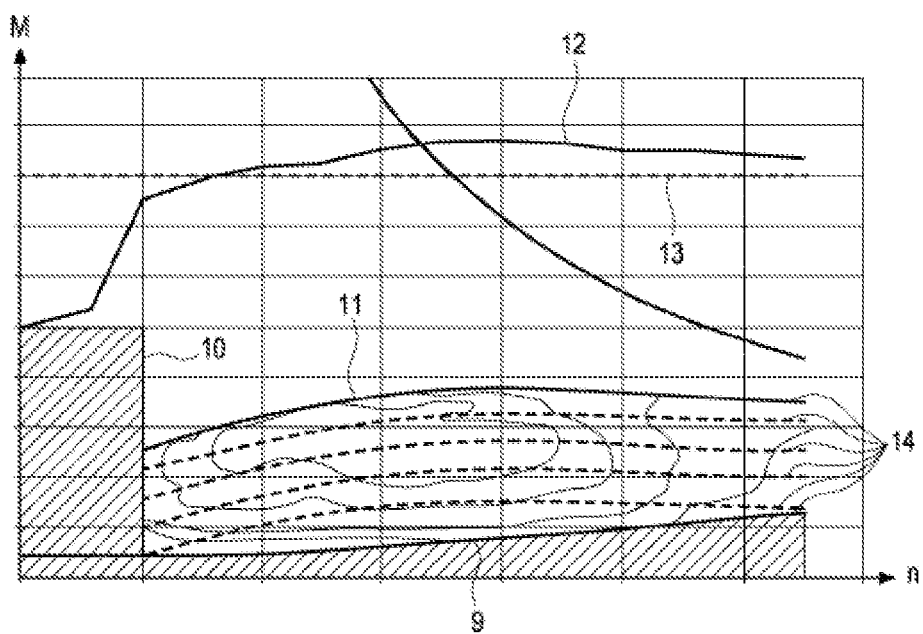
FIG. 2 shows a torque-speed diagram for the drive device.

FIG. 2 shows a diagram in which a torque M is plotted against a speed n. The diagram preferably describes the drive units 2 and 3 together so that the torque is the drive torque applied to the intermediate shaft 6, and the speed n is the speed of the intermediate shaft 6. A lower torque limit 9 and a lower rotational speed limit 10 can be seen, and when these are undershot, the drive torque applied to the intermediate shaft 6 is provided solely by means of the second drive unit 3. If the drive torque, which is set to a specified torque, exceeds the lower torque limit 9, and the speed of the intermediate shaft 6 exceeds the lower speed limit 10, the first drive unit 2 is used in addition to the second drive unit 3 to drive the intermediate shaft 6.

A maximum torque 11 of the first drive unit 2 is indicated in the diagram. If the drive torque exceeds such maximum torque 11, the drive torque cannot be provided by means of the first drive unit 2 alone. Rather, the second drive unit 3 is also operated to provide the drive torque. A total torque 12, which theoretically could be provided by the two drive units 2 and 3, is also shown. However, this total torque 12 is limited to a transmission limit torque 13 for which the gear change transmission 7 is designed.

It can be seen that multiple torque characteristics 14 are indicated for the first drive unit 2, wherein the torque lower limit 9 and the maximum torque 11 can also be used as torque characteristics 14. During operation of the drive device 1, it is now provided, at least in a first operating mode, before changing the speed of the drive shaft 8 for the first drive unit 2, to select a specific torque characteristic 14 from the multiple torque characteristics 14. While the rotational speed is being changed, the first drive unit 2 should be operated exclusively in accordance with the selected torque characteristic 14 in order to provide at least part of the drive torque or the specified torque. The second drive unit 3, on the other hand, is operated in order to compensate for a difference between the torque provided by the first drive unit 2 and the specified torque.

Figure 3:
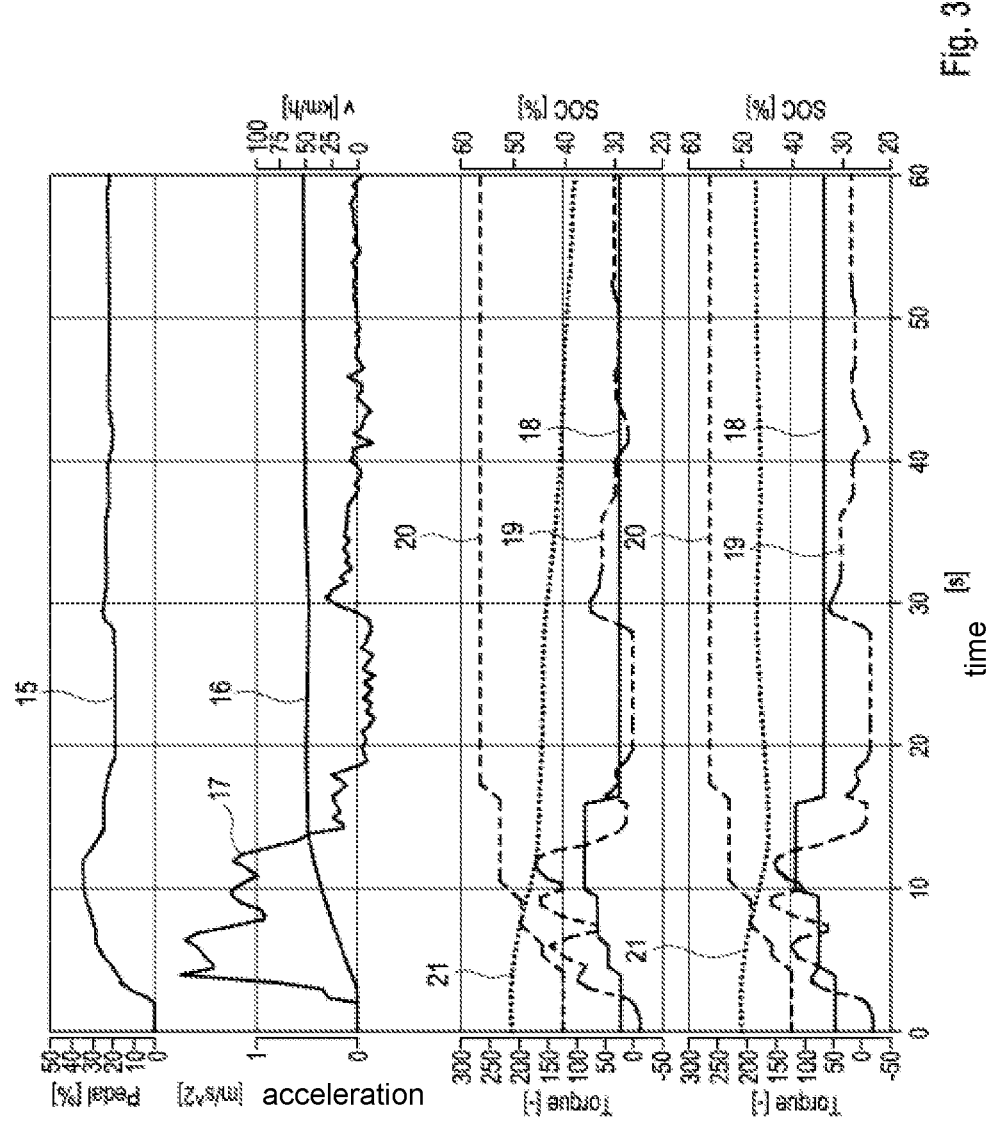
FIG. 3 shows diagrams for explaining an operating method of the drive device.

FIG. 3 shows several diagrams on the basis of which the method for operating the drive device 1 is explained in more detail. In the top diagram, plot 15 indicates an accelerator pedal position over time t. In the diagram below, plot 16 shows a driving speed of the motor vehicle which corresponds to a speed of the drive shaft 8, and plot 17 shows the acceleration that matches plot 16.

The two lower diagrams each show plots 18, 19, 20 and 21. Plot 18 describes the torque provided by the first drive unit 2, and plot 19 describes the torque provided by the second drive unit 3. In total, the two torques result in the drive torque. Plot 20 shows the currently engaged gear, and plot 21 shows the charge level of an energy storage device.

It can be seen from plot 18 that the torque of the first drive unit 2 is changed in stages, i.e. it does not immediately follow plot 15, which shows the specified torque over time.

It can also be seen that the torque of the first drive unit 2 is only changed in the exemplary embodiment shown when a gear change takes place with the aid of the gear change transmission 7 (see plot 20). At most, when the speed or velocity changes, the torque of the first drive unit 2 changes according to the selected torque characteristic 14. The different levels of the torque of the first drive unit 2 result from the use of the specified torque characteristics. Here, one of the torque characteristics is assigned to each torque level.

The upper of the two diagrams, in which plots 18, 19, 20 and 21 are shown, shows them for a higher charge level of the energy store than the lower diagram. Correspondingly, in the upper diagram, a larger proportion of the drive torque is generated with the aid of the second drive unit 3, whereas the torque of the first drive unit 2 is set lower than for the lower diagram. Consequently, plot 21 for the upper diagram shows a rapid decrease in the charge level of the energy store, while the charge level remains virtually constant in the lower diagram.

With the aid of the procedure described for operating the drive device 1, particularly efficient operation is achieved, in particular in the case of transient operation of the drive device with a change in the speed of the drive shaft 8 and/or the intermediate shaft 6. Here, a basic torque is provided with the aid of the first drive unit 2, which is kept constant over longer periods of time or on the selected torque characteristic 14 when the speed changes. Dynamic processes, i.e. rapid changes in the drive torque, are implemented with the aid of the second drive unit 3.

LIST OF REFERENCE NUMBERS 1 drive device
2 first drive unit
3 second drive unit
4 gear arrangement
5 separating clutch
6 intermediate shaft
7 gear change transmission
8 drive shaft
9 lower torque limit
10 lower speed limit
11 maximum torque
12 total torque
13 gear limit torque
14 torque characteristics
15 plot
16 plot
17 plot
18 plot
19 plot
20 plot
21 plot

The invention claimed is:

1. A method for operating a drive device for a motor vehicle, the drive device having a first drive unit designed as an internal combustion engine and a second drive unit designed as an electrical machine, which jointly provide a drive torque of the drive device on a drive shaft at least temporarily, the method comprising:
    setting the drive torque to a requested specified torque,
    wherein, in a first operating mode and before a speed of the drive shaft is changed for the first drive unit, a torque characteristic is selected from a plurality of torque characteristics,
    wherein, in the first operating mode and while the speed of the drive shaft is changed, the first drive unit is operated exclusively in accordance with the selected torque characteristic to provide at least a part of the specified torque, and a difference between the at least part of the specified torque and the specified torque is provided by the second drive unit,
    wherein each of the plurality of torque characteristics prescribe at least one of a constant throttle valve position of the first drive unit and a constant cylinder charge of the first drive unit,
    wherein each of the plurality of torque characteristics reflect a discrete torque characteristic and differ from one another by at least 5% of a nominal torque of the first drive unit, and
    wherein the selected torque characteristic is maintained until a gear change of a gear change transmission, and a new torque characteristic is selected from the plurality of torque characteristics only when the gear change is made.

2. The method according to claim 1, wherein the torque characteristic is selected based on at least one of: a specified torque present before the speed of the drive shaft is changed; a charge level of an energy store of the second drive unit; and a temperature of the drive device.

3. The method according to claim 1, wherein the plurality of torque characteristics differ from one another by at least 10% of the nominal torque of the first drive unit.

4. The method according to claim 1, wherein, in a second operating mode, the first drive unit and the second drive unit are operated for providing the drive torque corresponding to the specified torque so that there is minimal energy consumption for a current operating point.

5. A drive device for a motor vehicle comprising a first drive unit designed as an internal combustion engine and a second drive unit designed as an electrical machine, which jointly provide a drive torque of the drive device on a drive shaft at least temporarily,
    wherein the drive device is configured to perform the method according to claim 1.

6. The drive device according to claim 5, wherein the first drive unit has a first nominal power and the second drive unit has a second nominal power, and
    wherein the first nominal power is greater than the second nominal power by a factor of at most 5, at most 4, at most 3, or at most 2, or is equal to the second nominal power.

7. The drive device according to claim 5, wherein the first drive unit and the second drive unit are temperature-controlled by a common direct cooler.

8. The method according to claim 1, wherein each of the plurality of torque characteristics prescribe the constant throttle valve position of the first drive.

9. The method according to claim 1, wherein each of the plurality of torque characteristics prescribe the constant cylinder charge of the first drive unit.

10. The method according to claim 5, wherein the first drive unit is naturally aspirated.

11. The method according to claim 2, wherein the torque characteristic is selected based on at least the specified torque present before the speed of the drive shaft is changed.

12. The method according to claim 2, wherein the torque characteristic is selected based on at least the charge level of the energy store of the second drive unit.

13. The method according to claim 2, wherein the torque characteristic is selected based on at least the temperature of the drive device.

* * * * *